Dec. 13, 1966  B. R. SIMMONS ETAL  3,291,327
MINE TRAILER
Filed July 2, 1964  2 Sheets-Sheet 1
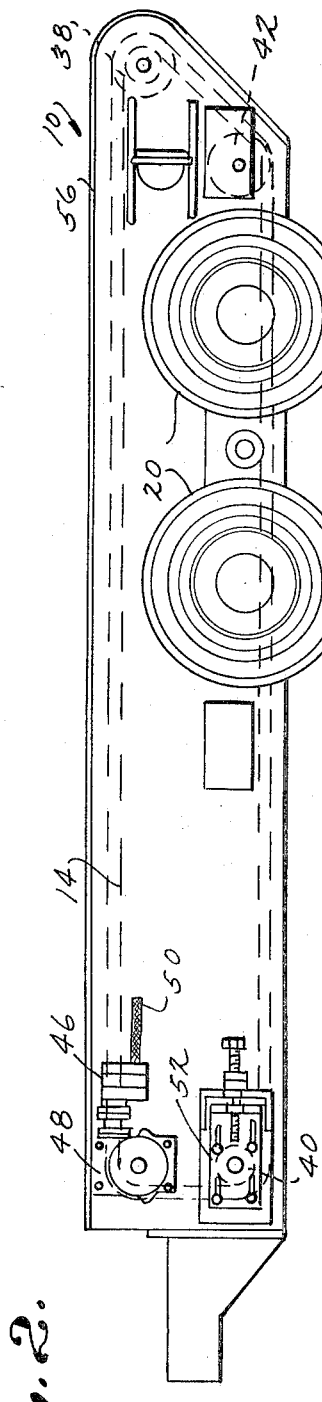
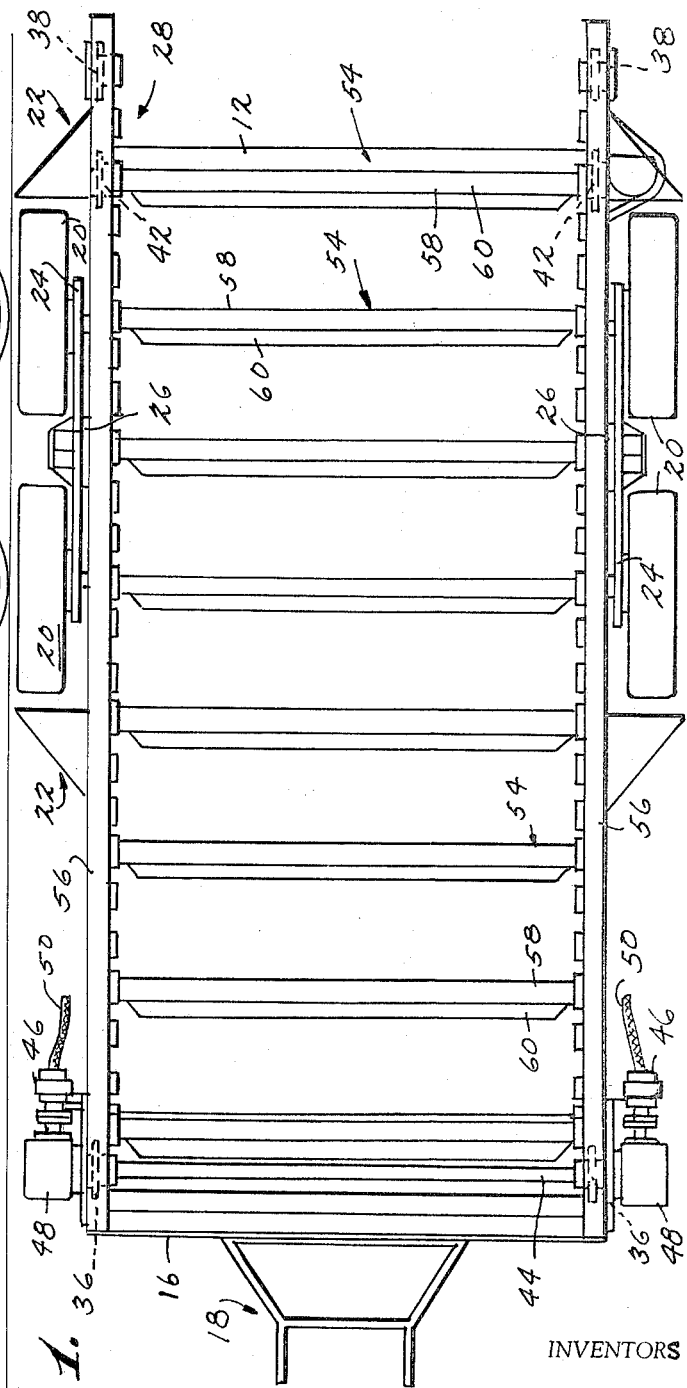
Fig. 2.
Fig. 1.
INVENTORS
BERNARD R. SIMMONS
BOBBY J. MYERS
BY Cushman, Darby & Cushman
ATTORNEYS

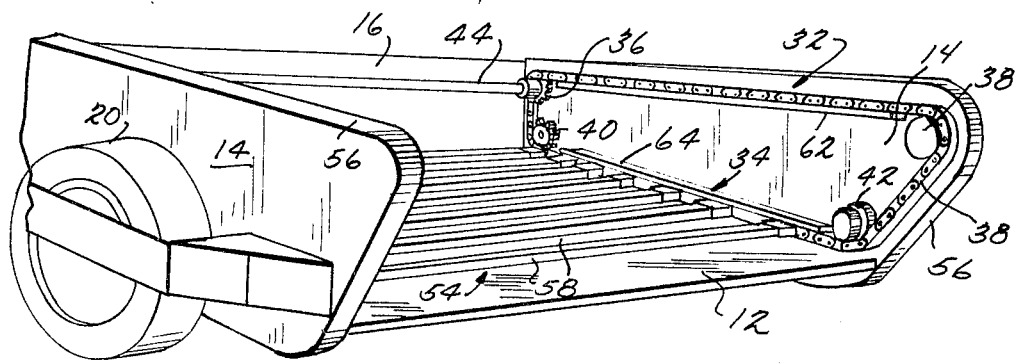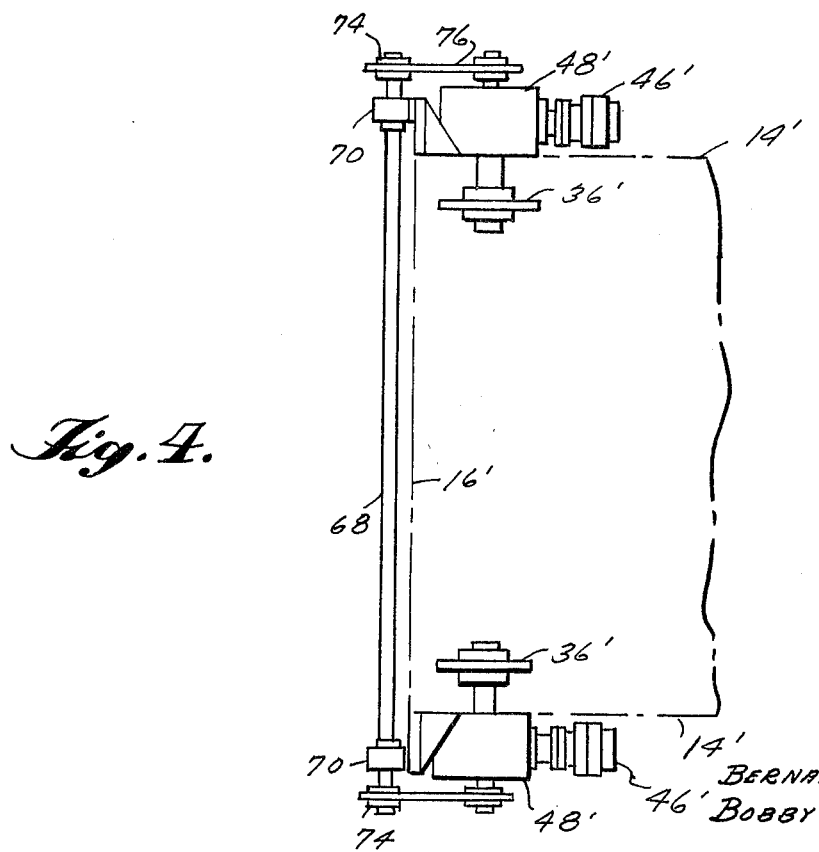

United States Patent Office 3,291,327
Patented Dec. 13, 1966

3,291,327
MINE TRAILER
Bernard R. Simmons and Bobby J. Myers, Richlands, Va., assignors to S & S Machinery Company, Inc., Richlands, Va., a corporation of Virginia
Filed July 2, 1964, Ser. No. 379,909
4 Claims. (Cl. 214—83.36)

This invention relates to machines for hauling and discharging material and in particular to machines having an endless conveyor assembly for discharging the material from the machine.

It is known to construct certain haulage and discharge equipment, such as that employed in mines for moving coal and the like, with an endless conveyor which is operable to move the contents of the machine toward one end for discharge. An example of this type of machine is a mobile trailer constructed with an open top through which coal and the like is loaded and having a bottom wall which is wholly or partly scraped by the upper flights of an endless conveyor. Conventionally, the conveyor assembly includes a pair of transversely spaced looped chains or other endless members extending forwardly and rearwardly of the trailer and carrying a plurality of scraper flights which extend across the trailer. The chains are mounted on sprockets in a position such that the upper lengths of the chains are disposed just above the bottom wall and their lower lengths are disposed below the bottom wall whereby movement of the chain moves the flights along the bottom wall to carry material toward one end of the trailer where it is discharged.

In this conventional arrangement the lower half of the chains and sprockets which are employed at each end of each chain are disposed below the bottom wall so that space which would otherwise be available for trailer contents is occupied by the sprockets and one-half of the chains. That is, the bottom wall must be located at a sufficient height above the ground to accommodate the sprockets. Since the sprockets employed in this type of equipment are large in diameter in order to handle a great weight of material, the space wasted by them is significant. In addition, repair of the assembly is difficult because the sprockets are inaccessible for maintenance and because the looping of the chains around the bottom wall renders replacement of the chains time-consuming and difficult.

It is the primary object of the present invention to overcome the aforesaid disadvantages of wasted space and inaccessibility of the conveyor parts by locating the chains or other endless members entirely above the bottom wall of the machine so that the diameter of the chain-supporting sprockets does not affect the height of the bottom wall and so that the sprockets and endless members are readily accessible for repair.

It is a more specific object to overcome the aforesaid disadvantages by providing a haulage and discharge vehicle in which the upper and lower lengths of looped endless members of a conveyor assembly are vertically spaced apart a distance equal to or greater than the depth of the load in the vehicle and in which the lower loops are disposed just above the bottom wall of the vehicle. Upon operation of the assembly the conveyor flights, or analogous elements which extend between the endless members, move rearwardly along the bottom wall to urge the vehicle contents toward an open discharge end. The flights then move upwardly at the discharge end to an elevation at or above the load, then forwardly above the load and then downwardly to just above the bottom wall.

It is a further object to provide a vehicle having the aforesaid arrangement of upper and lower loops in an endless conveyor assembly in which conveyor flights are associated with only a portion of each endless member so that the flights can be disposed in a position in which they do not interfere with loading the vehicle from above.

The invention will be further understood from the following detailed description taken with the drawing in which:

FIGURE 1 is a top plan view of a mobile trailer embodying the principles of the present invention;
FIGURE 2 is a side elevational view of the trailer of FIGURE 1; and
FIGURE 3 is a perspective view of the trailer.
FIGURE 4 is a top plan view of a modified arrangement for driving the chains.

Referring to the drawings there is shown a trailer 10 which is adapted for hauling coal and the like in a mine. The body of the trailer 10 is defined by a flat, horizontal bottom wall 12, a pair of vertical side walls 14 and a vertical front end wall 16 which define an open-topped container having an open rear end. The front wall 16 is provided with a hitch 18 by means of which the trailer 10 may be connected to a tractor (not shown). Rearwardly of the center of gravity the trailer 10 is supported by two pairs of ground-engaging tandem wheels 20 carried within a framework 22 on the outside of each side wall 14. The wheels 20 on each side 14 are journalled on a vertical plate 24 which is itself journalled by a lug 26 extending through the respective side wall 14 so that the trailer 10 is pivotable about a horizontal axis through the lugs 26.

An endless conveyor 28 for urging trailer contents rearwardly and for discharging the same through the open end is carried by the side walls 14. The conveyor 28 includes a pair of endless flexible members such as roller link chains 30, disposed in vertical planes, one chain being disposed adjacent each side wall 14. The chains 30 are looped so as to have a long upper portion 32 extending longitudinally of the trailer 10 at an elevation near the top edges of the side walls 14 and a long lower portion 34 extending longitudinally just above the bottom wall 12. Each chain 30 is looped over a drive sprocket 36, an idler sprocket 38 and two idler rollers 40, 42, each of which is mounted on the inner surface of the respective side wall 14 for rotation about a horizontal axis extending at a right angle to the side wall 14.

The drive sprockets 36 are located at the front end of the trailer 10 near the upper edges of the side walls 14 and are interconnected by a transverse shaft 44. A pair of hydraulic motors 46 and associated speed reducers 48, secured to the outsides of the side walls 14, are drivingly connected to the drive sprockets 36 in a conventional manner. Pressurized oil for operating the motors 46 is supplied through flexible lines 50 from a pump on the tractor (not shown). As seen in FIGURE 2, the forward idler rollers 40 are mounted on a vertical plate 52 which is adjustable forwardly and rearwardly to give the desired slack in the chains 30.

A plurality of longitudinally spaced conveyor flights 54 are connected between corresponding portions of the two chains 30. According to the principles of the invention, a first portion of each chain 30 is free of flights 54 so that the chains 30 may be revolved to a position in which no flights are disposed between the upper edges of the side walls 14. This arrangement permits loading of the trailer 10 from above without interference from the flights 54. Usually the lengths of the chains which are devoid of flights 54 should be at least equal to the length of the open top so as to permit loading at any point. However, a greater flight-free portion, for example up to about one-half of the lengths of the chains 30, may be employed if desired. In some constructions, where loading will normally occur at a predetermined location in the trailer, it may be convenient to fix flights to a very substantial portion of the chain lengths, leaving only a relatively small area through which loading occurs.

In order to prevent the flights 54 from carrying material back into the trailer 10 the idler sprockets 38, which are mounted near the upper edges of the side walls 14, are extended rearwardly beyond the rear idler rollers 42 and beyond the rear end of the bottom wall 12. As shown, the upper portions of the side walls 14 themselves extend rearwardly of the bottom wall 12 so as to provide support for the idler sprockets 38, however, mounting brackets may be used for supporting the sprockets 38 if desired. The illustrated arrangement is preferred because a channel-shaped guard 56 can be secured, as by welding, to the entire exposed edge of each side wall 14 for the purpose of preventing contact of the chains 30 with extraneous objects.

As shown, each flight 54 consists of an elongated bar member 58 of rectangular cross section and a thin trailing fin 60 secured to the lower edge of the bar member 58. The construction of the flights is not critical and other shapes may be employed if desired.

As seen in FIGURE 3 the upper length 32 of each chain 30 slides along the upper surface of a horizontal plate 62 which is welded along one edge to the respective side wall 14. A similar plate 64 is provided just above the lower length 34 of each chain loop.

In operation of the conveyor 28 during an unloading operation, the hydraulic motors 46 are activated to drive the chains 30 by means of the drive sprockets 36 and the shaft 44 in a direction counterclockwise as viewed in FIGURE 2. The flights 54, in moving rearwardly along the bottom wall 12, urge material in the trailer 10 toward the open rear end. When the material reaches the rear end of the bottom wall 12 it falls by gravity between the flights 54 which at this point are moving rearwardly and upwardly. The rearward component of movement prevents any tendency of the flights 54 to carry the material back into the trailer 10. After the flights 54 have moved up over the idler sprockets 38 they move forwardly over the top of the remaining trailer load, then downwardly along the front wall 16 and then rearwardly again along the bottom wall 12. When the trailer 10 is to be loaded from above the chains 30 are revolved to a position such as that shown in the drawings in which the flights 54 are disposed along the bottom wall 12. Motion of the chains 30 is then stopped so that material can enter the trailer 10 through its open top without striking any of the flights 54.

The conveyor 28 can also be used to advantage when the trailer 10 is to be loaded at its rear end. In this case the chains 30 can be rotated intermittently in the reverse direction during loading to move the flights 54 forwardly along the bottom wall 12 and thereby urge the load toward the front of the trailer 10. This eliminates the need for a long boom on the loading machine and is advantageous because a short loading boom is much more desirable under the low clearance conditions which exist during rear loading.

FIGURE 4 illustrates a different drive arrangement for the chains in which the drive sprockets are synchronized with a transverse shaft disposed outside the trailer compartment. As shown, the arrangement includes, as before, a drive sprocket 36′ rotatably mounted on the inside of each side wall 14′ near the front end of the trailer and separate reversible hydraulic motors 46′ and gear reducers 48′ attached to the outside of each side wall 14′. A horizontal shaft 68 extending across the trailer is mounted forwardly of the front wall 16 by means of a pair of spaced bearings 70 attached by brackets 72 to the side walls 14′. On each end of the shaft 68 is a sprocket wheel 74 which is driven by a chain 76 looped over the wheel 74 and over another sprocket 78 mounted on the output shaft of the respective gear reducer 48′. Movement of the conveyor drive sprockets 36′ is thereby synchronized by means of the shaft 68 and chains 76.

It will thus be appreciated that the arrangement of the present invention achieves several advantages not attained in prior structures. Firstly, the chains, sprockets and rollers in the present arrangement, being entirely exposed are readily accessible for maintenance and replacement. Secondly, and even more important, the presence of the conveyor together with its sprockets and rollers does not affect the capacity of the vehicle. In prior structures, as pointed out before, the diameter of the sprockets and rollers determines the distance between the upper and lower lengths of the looped chains. This in turn determines the height of the bottom wall of the vehicle because the bottom wall, in conventional constructions, is disposed between the upper and lower lengths of the chains. Thus, in heavy duty equipment where large sprockets and rollers are required the conventional arrangement wastes an increasing amount of trailer space as the size of sprockets increases. In the present arrangement, however, the chains, sprockets and rollers are carried within the haulage space, and their size may be increased without any appreciable effect on the volume of material which can be handled. A vehicle constructed according to the invention and having a body measuring 12 feet long by 7 feet wide by 2 feet high has a capacity of substantially 168 cubic feet. The same sized body constructed in the conventional manner has a capacity of about 126 cubic feet because the bottom wall of the body must be raised to make space for the sprockets.

While an example of the invention has been described with particularity in order to illustrate the principles involved, the details thereof are intended to be illustrative and not limiting except as they appear in the appended claims.

What is claimed is:

1. A mobile vehicle for use in underground mines for hauling material from a loading location to a discharge location and for discharging material at the latter location, said vehicle comprising: an open-top vehicle body adapted to be loaded from above and to discharge material from one end in a longitudinal direction, said vehicle body having spaced apart side walls and a bottom wall terminating at said one end; conveyor means mounted in said body, said conveyor means including a looped endless member mounted in a vertical plane near the inner surface of each side wall, each endless member having a lower run extending along the length of the upper surface of said bottom wall and an upper run disposed at a level near the upper edges of said side walls, said conveyor further including a plurality of transverse, spaced-apart, material-moving flights extending between said endless members, said flights being disposed along only a portion of the length of said endless members, the remaining length of said endless members being free of flights and of a magnitude such that a substantial area of the open top of said vehicle body is free of flights when said endless members are revolved to a load position at which at least some of said flights are positioned adjacent the upper surface of said bottom wall; and drive means carried by said vehicle for intermittently revolving said endless members in a direction to move said flights along said bottom wall toward said one end of said body whereby material in said vehicle body will be discharged from said one end during operation of said drive means and whereby material may be toploaded into said vehicle body without interference from said flights when said endless members are revolved and stopped in said load position.

2. A vehicle as in claim 1 wherein said drive means is reversible whereby said flights may be moved along said bottom wall in a direction away from said one end of said vehicle body during an intermittent loading operation so as to urge incoming material toward the other end of said body.

3. A vehicle as in claim 1 wherein said bottom wall is horizontal throughout substantially its whole length, wherein the upper run of each of said endless members extends longitudinally outwardly of said bottom wall at said one end of said vehicle body, and wherein the lower run of each of said endless members is coextensive with said bottom wall whereby during a discharging operation said flights move upwardly and longitudinally outwardly from the end of said bottom wall thereby preventing material from being carried back into said vehicle body.

4. A vehicle as in claim 3 wherein an end portion of said side walls extends longitudinally outwardly beyond said bottom wall and wherein each of said endless members is looped over a plurality of rotatable wheel members carried by the respective side wall, there being a wheel means disposed on each side wall adjacent the end of said bottom wall and another wheel means disposed on each side wall portion at a location outwardly of the first-mentioned wheel means.

References Cited by the Examiner

UNITED STATES PATENTS

| | | | |
|---|---|---|---|
| 709,723 | 9/1902 | Ray | 214—83.36 |
| 2,637,457 | 5/1953 | Barrett | 198—172 X |
| 2,783,890 | 3/1957 | Harlan | 198—174 X |
| 3,187,910 | 6/1965 | Decker et al. | 214—83.36 |

GERALD M. FORLENZA, *Primary Examiner.*

ALBERT J. MAKAY, *Examiner.*